(12) United States Patent
Kleinfeld et al.

(10) Patent No.: US 11,867,240 B2
(45) Date of Patent: Jan. 9, 2024

(54) CONSTANT VELOCITY JOINT PROTECTOR

(71) Applicant: Steering Solutions IP Holding Corporation, Saginaw, MI (US)

(72) Inventors: Brian J. Kleinfeld, Saginaw, MI (US); James M. Petrowski, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 205 days.

(21) Appl. No.: 17/134,834

(22) Filed: Dec. 28, 2020

(65) Prior Publication Data

US 2022/0034371 A1 Feb. 3, 2022

Related U.S. Application Data

(60) Provisional application No. 63/060,189, filed on Aug. 3, 2020.

(51) Int. Cl.
*F16D 3/84* (2006.01)
*B60B 35/12* (2006.01)

(52) U.S. Cl.
CPC ............ *F16D 3/845* (2013.01); *B60B 35/128* (2013.01); *B60B 2900/511* (2013.01); *Y10S 464/906* (2013.01)

(58) Field of Classification Search
CPC . F16D 3/845; B60B 35/128; B60B 2900/511; Y10S 464/906

USPC ......................................................... 464/175
See application file for complete search history.

(56) References Cited

U.S. PATENT DOCUMENTS

| 4,456,269 | A | * | 6/1984 | Krude | F16J 3/042 464/175 |
| 4,767,381 | A | * | 8/1988 | Brown | F16D 3/845 464/906 |
| 5,145,191 | A | * | 9/1992 | Stewart | F16J 3/043 464/175 |
| 5,318,480 | A | * | 6/1994 | Essi | F16J 3/048 464/175 |
| 9,494,198 | B2 | * | 11/2016 | Nicholas | F16D 3/223 |

FOREIGN PATENT DOCUMENTS

JP  57-171124 A * 10/1982 ............... 464/175

* cited by examiner

*Primary Examiner* — Greg Binda
(74) *Attorney, Agent, or Firm* — Dickinson Wright PLLC

(57) ABSTRACT

A constant velocity joint assembly includes a constant velocity joint. The constant velocity joint assembly also includes a sealing boot in contact with the constant velocity joint. The constant velocity joint assembly further includes a boot protector disposed on a radially outer surface of a portion of the sealing boot. The constant velocity joint assembly yet further includes a first fastener coupled to the boot protector to secure the boot protector to the constant velocity joint.

4 Claims, 2 Drawing Sheets

CONSTANT VELOCITY JOINT PROTECTOR

CROSS-REFERENCE TO RELATED APPLICATION

This patent application claims the benefit of priority to U.S. Provisional Patent Application Ser. No. 63/060,189, filed Aug. 3, 2020, the disclosure of which is incorporated by reference herein in its entirety.

BACKGROUND

Constant velocity joints are widely used for the transmission of rotational energy. Constant velocity joints allow a drive shaft to transmit power through a variable angle, at constant rotational speed. These telescoping constant velocity joints transmit a torque at various rotational speeds, joint angles and telescopic positions between shaft members. A sealing boot is typically secured at an interface to the constant velocity joint.

Certain vehicle applications may result in a buildup of debris on adjacent surfaces within the vehicle architecture. This buildup of debris may result in nominal or momentary contact between the sealing boot and the debris accumulation. Direct contact between accumulated debris and the sealing boot may result in a disassembly of the sealing boot from an outer race of the constant velocity joint, or even rupture of the sealing boot. Failure of the sealing boot may lead to failure of the half shaft assembly.

SUMMARY

According to one aspect of the disclosure, a constant velocity joint assembly includes a constant velocity joint. The constant velocity joint assembly also includes a sealing boot in contact with the constant velocity joint. The constant velocity joint assembly further includes a boot protector disposed on a radially outer surface of a portion of the sealing boot. The constant velocity joint assembly yet further includes a first fastener coupled to the boot protector to secure the boot protector to the constant velocity joint.

According to another aspect of the disclosure, a vehicle driveline system includes a first shaft. The system also includes a second shaft. The system further includes a constant velocity joint coupling the first shaft and the second shaft. The system yet further includes a sealing system. The sealing system includes a sealing boot in contact with the constant velocity joint. The sealing system also includes a boot protector disposed on a radially outer surface of a portion of the sealing boot, wherein the boot protector comprises a first segment and a second segment, the first segment and the second segment oriented at a non-parallel angle relative to each other. The sealing system further includes a first fastener coupled to the boot protector to secure the boot protector to the constant velocity joint, the first fastener at least partially disposed within a recess defined by an outer surface of the boot protector.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A constant velocity joint assembly 10 is described herein and illustrated in the Figures. The embodiments disclosed herein may be utilized in any type of steering system. By way of non-limiting example, the embodiments may benefit a vehicle, such as a car, truck, sport utility vehicle, crossover, mini-van, marine craft, aircraft, all-terrain vehicle, recreational vehicle, or other suitable vehicles that include driveline systems, as well as various steering system schemes, for example, steer-by-wire and driver interface steering.

The constant velocity joint assembly 10 is a joint which is configured to transmit torque between a first shaft member 12 and a second shaft member 14 through various rotational speeds, joint angles, or telescopic positions. In some embodiments, the constant velocity joint assembly 10 is configured such that it may be used in a driveline for transferring a rotational torque from one driveline component to another driveline component. The constant velocity joint assembly facilitates angular displacement or angular movement of components that are interconnected by the constant velocity joint while still facilitating the transmission of torque.

Figure 1:
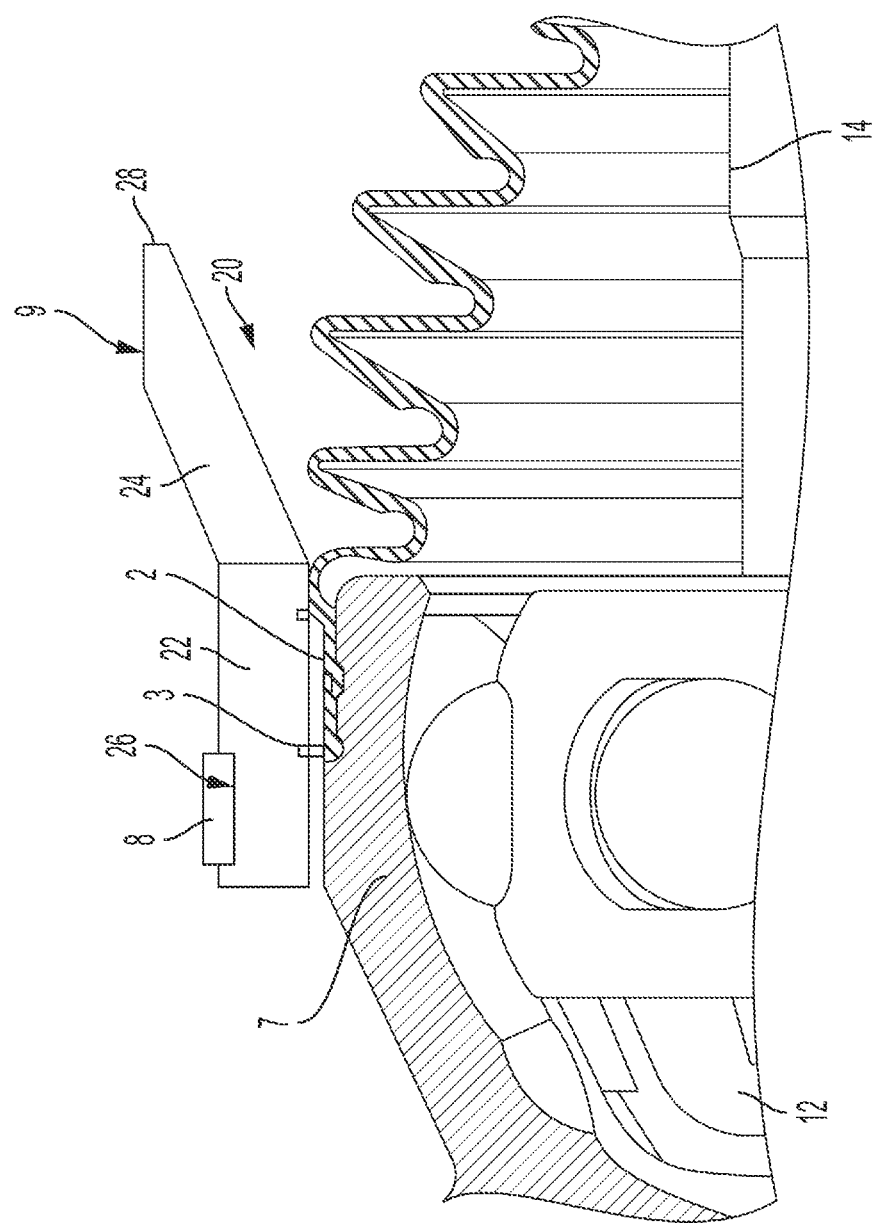
FIG. 1 is a perspective view of a constant velocity joint assembly with a boot protector.
Figure 2:
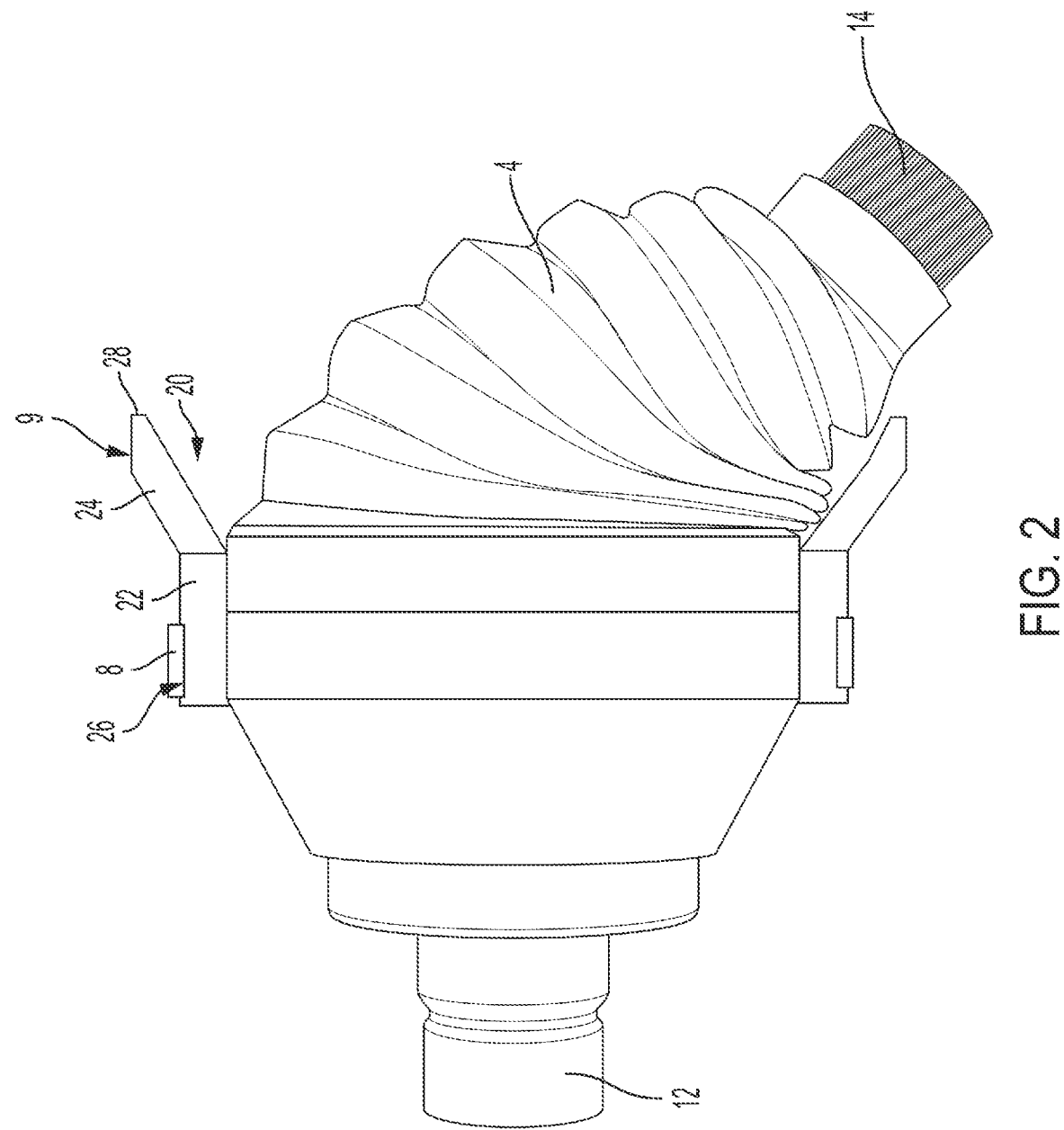
FIG. 2 is a perspective view of a sealing boot disposed at an angled orientation during operation.

Referring to FIGS. 1 and 2, a sealing system 20 for the overall assembly comprises a constant velocity joint 1, a sealing boot 4, and a fastening clamp 3. The sealing boot 4 and the fastening clamp 3 are designed to retain grease within the joint 1 to maintain desired lubrication for operation. The sealing boot 4 also prevents exterior elements (e.g., debris) from entering the joint 1 during joint rotation, angulation, and plunging. A boot skirt 2 is compressed between a constant velocity joint outer race 7 and the fastening clamp 3.

The sealing boot 4 may be formed of various suitable materials in different embodiments. In one non-limiting example, a thermoplastic elastomeric material (TPE) is employed to provide satisfactory flex and abrasion characteristics. The sealing boot 4 encloses a portion of one of the shafts and is flexible to accommodate angulation—or other movement—of the shaft during operation. As shown in the illustrated embodiment, the sealing boot 4 may be a convoluted structure or a corrugated structure that includes a plurality of segments that are capable of flexing relative to each other.

The boot skirt 2 extends axially to overlap with an outer radial surface of the outer race 7 of the constant velocity joint 1. The fastening clamp 3 extends completely circumferentially (i.e., 360 degrees) around the boot skirt 2 in some embodiments to couple and seal the sealing boot 4 to the outer race 7. However, it is contemplated that a plurality of circumferentially spaced clamp segments may be provided in some embodiments.

The sealing system 20 includes an accessory referenced herein as a boot protector 9. The boot protector 9 installs onto the constant velocity joint 1 and the sealing boot 4. The boot protector 9 is designed to be compressed between the constant velocity outer race 7 and the accessory clamp 8. The boot protector 9 is able to be added to existing sealing systems for constant velocity joints as a retrofit component.

The boot protector 9 extends completely circumferentially (i.e., 360 degrees) around the boot skirt 2 in some embodiments. However, it is contemplated that a plurality of circumferentially spaced protector segments may be provided in some embodiments. The exterior shape of the boot protector 9 is configured to prevent contact of the sealing boot 4 and the ordinary vehicle architectural elements, and to rotate and sweep in vehicle space in advance of the sealing boot 4, thus clearing accumulated debris that would otherwise interfere with the sealing boot 4.

In some embodiments, the boot protector 9 includes a first segment 22 and a second segment 24. The first and second segments 22, 24 are oriented at a non-parallel angle relative to each other in the illustrated embodiment. The particular angular orientation may vary depending upon the particular application of use. In the illustrated orientation, the first segment 22 extends axially in an annular manner about a longitudinal axis of the sealing boot 4 when the sealing boot is in a non-flexed condition. The second segment 24 tapers radially outwardly in an axial direction extending from the first segment 22 to an end 28 of the second segment.

The interior shape of the boot protector 9 is configured to avoid interference with the ordinary function of the sealing boot 4 during the full range of constant velocity joint motion. FIG. 2 illustrates a position of the sealing boot 4 within the range of motion. The interior shape is also designed with a taper angle configured to expel debris that may enter the space between the sealing boot 4 and the boot protector 9.

The boot protector 9 material is flexible and non-rigid to prevent adhesion and buildup of debris on the interior or exterior surfaces of the boot protector 9.

The boot protector 9 includes an exterior recess 26 to allow for placement of an accessory clamp 8. Disposing the accessory clamp 8 at least partially within the exterior recess 26 reduces the accessory clamp profile projecting from the boot protector 9. The exterior recess 26 may be formed in any suitable manner, such as a molding process. The exterior recess 26 is a gland, opening or another similar feature for receiving the accessory clamp 8.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A constant velocity joint assembly comprising:
   a constant velocity joint;
   a sealing boot in contact with the constant velocity joint, wherein the sealing boot includes a boot skirt extending axially to be in contact with a radially outer surface of an outer race of the constant velocity joint;
   a boot protector disposed on, and in contact with, a radially outer surface of a portion of the sealing boot, wherein the boot protector comprises a first segment and a second segment, the first segment and the second segment oriented at a non-parallel angle relative to each other, an entirety of the second segment angled radially outwardly along a direction from the first segment to an end of the second segment, wherein an entirety of the second segment is spaced from the sealing boot and is radially even with or outward of the first segment;
   a first fastener coupled to the boot protector to secure the boot protector to the constant velocity joint; and
   a second fastener in contact with the boot skirt.

2. The constant velocity joint assembly of claim 1, wherein the sealing boot is at least partially formed of thermoplastic elastomeric material.

3. The constant velocity joint assembly of claim 1, wherein the sealing boot is a corrugated structure.

4. The constant velocity joint assembly of claim 1, wherein the first fastener is at least partially disposed within a recess defined by an outer surface of the boot protector.

\* \* \* \* \*